(12) United States Patent
Fan

(10) Patent No.: US 10,956,653 B2
(45) Date of Patent: Mar. 23, 2021

(54) METHOD AND APPARATUS FOR DISPLAYING PAGE AND A COMPUTER STORAGE MEDIUM

(71) Applicant: TENCENT TECHNOLOGY (SHENZHEN) COMPANY LIMITED, Shenzhen (CN)

(72) Inventor: Lin Fan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 93 days.

(21) Appl. No.: 16/038,393

(22) Filed: Jul. 18, 2018

(65) Prior Publication Data

US 2018/0322101 A1 Nov. 8, 2018

Related U.S. Application Data

(63) Continuation of application No. PCT/CN2017/074465, filed on Feb. 22, 2017.

(30) Foreign Application Priority Data

Mar. 23, 2016 (CN) .......................... 201610169387.2

(51) Int. Cl.
*G06F 40/106* (2020.01)
*H04L 29/08* (2006.01)

(52) U.S. Cl.
CPC ............ *G06F 40/106* (2020.01); *H04L 67/02* (2013.01); *H04L 67/22* (2013.01); *H04L 67/306* (2013.01); *H04L 67/10* (2013.01)

(58) Field of Classification Search
CPC ........ H04L 67/02; H04L 67/22; H04L 67/306
See application file for complete search history.

(56) References Cited

U.S. PATENT DOCUMENTS

| | | | |
|---|---|---|---|
| 6,636,648 B2 * | 10/2003 | Loui | G06T 11/60 |
| | | | 348/231.2 |
| 9,953,011 B1 * | 4/2018 | Anderson | G06F 17/217 |

(Continued)

FOREIGN PATENT DOCUMENTS

| | | |
|---|---|---|
| CN | 101471990 A | 7/2009 |
| CN | 103412647 A | 11/2013 |

(Continued)

OTHER PUBLICATIONS

The World Intellectual Property Organization (WIPO) International Search Report for PCT/CN2017/074465 dated Apr. 13, 2017 5 Pages (including translation).

*Primary Examiner* — Kyle R Stork
(74) *Attorney, Agent, or Firm* — Anova Law Group, PLLC

(57) ABSTRACT

A method is provided for displaying a page. The method includes extracting, from a to-be-displayed page, page parameter information of the to-be-displayed page. The page parameter information includes at least one of a uniform resource locator (URL) of the to-be-displayed page, a type of page content, and a page domain name. The method also includes determining, according to the page parameter information of the to-be-displayed page, a display mode to display the to-be-displayed page; and displaying the to-be-displayed page according to the determined display mode.

13 Claims, 3 Drawing Sheets

(56) References Cited

U.S. PATENT DOCUMENTS

2003/0236879 A1* 12/2003 Moritani ............. G06F 16/9535
709/224
2009/0249194 A1* 10/2009 Day ................... G06F 16/9577
715/239
2017/0039206 A1* 2/2017 Broomhall ............ G06F 40/134

FOREIGN PATENT DOCUMENTS

| CN | 103455601 A | 12/2013 |
| CN | 103577466 A | 2/2014 |
| CN | 106095297 A | 11/2016 |

* cited by examiner

METHOD AND APPARATUS FOR DISPLAYING PAGE AND A COMPUTER STORAGE MEDIUM

CROSS-REFERENCES TO RELATED APPLICATIONS

This application is a continuation application of PCT Patent Application No. PCT/CN2017/074465, filed on Feb. 22, 2017, which claims priority to Chinese Patent Application No. 201610169387.2, titled "METHOD AND APPARATUS FOR DISPLAYING PAGE AND A COMPUTER STORAGE MEDIUM," filed on Mar. 23, 2016, all of which are incorporated by reference in entirety.

FIELD OF THE TECHNOLOGY

The present disclosure relates to the field of the Internet communications and, in particular, to a method and an apparatus for displaying a webpage and a computer storage medium.

BACKGROUND OF THE DISCLOSURE

Display modes of a mobile terminal include two modes, a landscape mode and a portrait mode. When a user uses the mobile terminal to browse different webpages or a user uses the mobile terminal in different postures to browse pages, the mobile terminal may adjust the display modes to display the webpages to facilitate browsing of the users.

Currently, the mobile terminal has two manners of displaying a page. The first manner is that the mobile terminal automatically sets a display mode to display the page. When the first manner is used, when detecting that a page is transversely placed, the mobile terminal displays the page in the landscape mode. When detecting that a page is vertically placed, the mobile terminal displays the page in the portrait mode. The second manner is that the user manually sets the mobile terminal to display a page in the landscape mode or the portrait mode.

However, for the foregoing first automatic setting manner, a mis-operation may easily occur. For the foregoing second manual setting manner, each time the display mode is set manually, it takes relatively more time and adds to the user operation.

The disclosed methods and systems are directed to solve one or more problems set forth above and other problems.

SUMMARY

To implement the automatic setting display manner and reduce mis-operations, embodiments of the present disclosure provide a method and an apparatus for displaying a page, and a computer storage medium. The technical solutions are as follows:

According to one aspect, a method for displaying a page is provided. The method includes extracting, from a to-be-displayed page, page parameter information of the to-be-displayed page. The page parameter information includes at least one of a uniform resource locator (URL) of the to-be-displayed page, a type of page content, and a page domain name. The method also includes determining, according to the page parameter information of the to-be-displayed page, a display mode to display the to-be-displayed page; and displaying the to-be-displayed page according to the determined display mode.

According to another aspect, an apparatus for displaying a page is provided. The apparatus includes a memory storing computer program instructions; and a processor coupled to the memory. When executing the computer program instructions, the processor is configured to perform: extracting, from a to-be-displayed page, page parameter information of the to-be-displayed page, the page parameter information including at least one of a uniform resource locator (URL) of the to-be-displayed page, a type of page content, and a page domain name; determining, according to the page parameter information of the to-be-displayed page, a display mode to display the to-be-displayed page; and displaying the to-be-displayed page according to the determined display mode.

According to another aspect, a non-transitory computer-readable storage medium is provided. The non-transitory computer-readable storage medium stores computer program instructions executable by at least one processor to perform: extracting, from a to-be-displayed page, page parameter information of the to-be-displayed page. The page parameter information includes at least one of a uniform resource locator (URL) of the to-be-displayed page, a type of page content, and a page domain name. The computer program instructions also cause the at least one processor to perform: determining, according to the page parameter information of the to-be-displayed page, a display mode to display the to-be-displayed page; and displaying the to-be-displayed page according to the determined display mode.

Other aspects of the present disclosure can be understood by those skilled in the art in light of the description, the claims, and the drawings of the present disclosure.

DETAILED DESCRIPTION

To make the objectives, technical solutions, and advantages of the present disclosure clearer, the following further describes embodiments of the present disclosure in detail with reference to the accompanying drawings.

The embodiments of the present disclosure provide a method for displaying a webpage or simply a page. A scenario to which the method is applied may be that, when a user browses a to-be-displayed page by using a mobile terminal, the mobile terminal displays the to-be-displayed page in a landscape mode or a portrait mode. The method may be performed in a browser or an application having a browser function. Certainly, the method may also be applied to one or more scenarios other than the above scenario, and the scenarios are not listed one by one herein.

In embodiments of the present disclosure, when displaying the to-be-displayed page, the mobile terminal may determine, according to a page parameter of the to-be-displayed page, a display mode in which the to-be-displayed page is displayed, and displays the to-be-displayed page in the determined display mode.

In certain embodiments, a detailed operation that the mobile terminal determines the display mode in which the to-be-displayed page is displayed may include the followings. The mobile terminal may obtain an information set, which includes page parameter information of a page displayed in a first display mode, and match page parameter information of the to-be-displayed page and page parameter information included in the information set. When, through matching, the information set includes the page parameter information of the to-be-displayed page, the mobile terminal may determine that the display mode in which the to-be-displayed page is displayed is a first display mode. When the information set does not include the page parameter information of the to-be-displayed page, the mobile terminal may determine that the display mode in which the to-be-displayed page is displayed is a second display mode. The first display mode may be a landscape mode and the second display mode may be a portrait mode, or the first display mode may be a portrait mode and the second display mode may be a landscape mode.

In certain embodiments, the information set may be specifically a configuration file or a database. The configuration file or database may be stored in the mobile terminal in advance, or the configuration file may be downloaded by the mobile terminal in advance from a cloud server located in a network and stored locally, or the configuration file may be temporarily downloaded by the mobile terminal from a cloud server when the to-be-displayed page is displayed.

Figure 1:
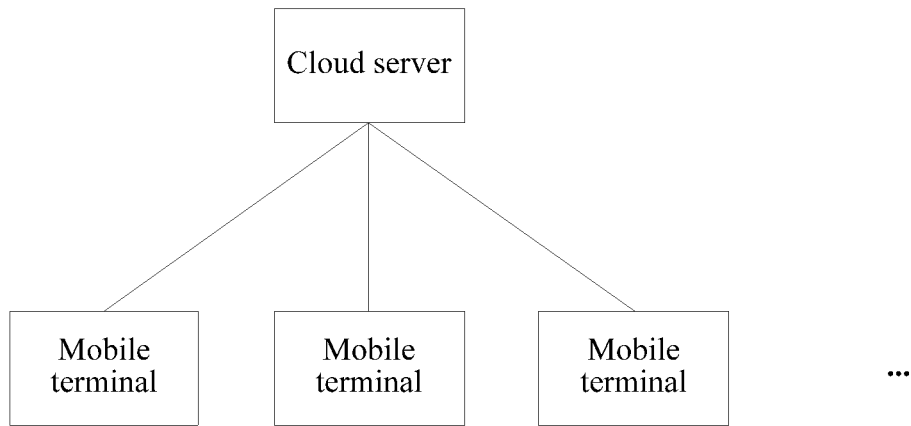
FIG. 1 illustrates a network architecture diagram according to an embodiment of the present disclosure.

Correspondingly, the embodiments of the present disclosure can be applied to a network architecture shown in FIG. 1. As shown in FIG. 1, the network architecture may include a cloud server and multiple mobile terminals. The cloud server may have the configuration file for mobile terminals to download and use. The configuration file in the cloud server may be obtained by collecting historical record information of users in advance and analyzing the historical record information, and the historical record information includes pages opened and displayed by the users on respective mobile terminals and display modes in which the pages are displayed.

The method for displaying a page by the mobile terminal is briefly described above, and detailed description for a detailed process is provided in any one of the following embodiments.

Figure 2:
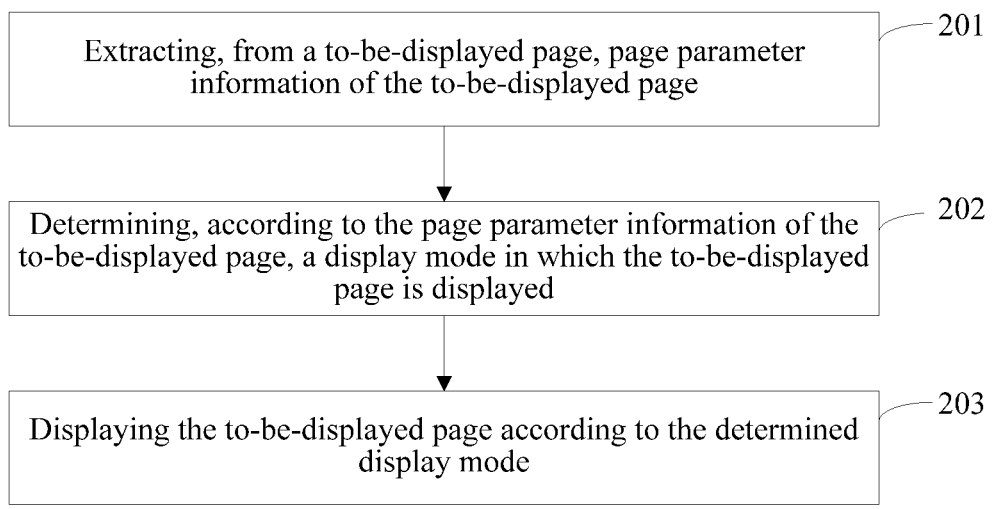
FIG. 2 illustrates a flowchart of a method for displaying a page according to an embodiment of the present disclosure.

Referring to FIG. 2, an embodiment of the present disclosure provides a method for displaying a page, including the followings.

Step 201: Extracting, from a to-be-displayed page, page parameter information of the to-be-displayed page, the page parameter information including at least one of a URL (uniform resource locator) of the to-be-displayed page, a type of page content, and a page domain name.

Step 202: Determining, according to the page parameter information of the to-be-displayed page, a display mode in which the to-be-displayed page is displayed.

Step 203: Displaying the to-be-displayed page according to the determined display mode.

That is, the display mode to display the to-be-displayed page is determined according to the page parameter information of the to-be-displayed page. As a result, the display mode can be automatically set, and the accuracy for determining the display mode according to the page parameter information of to-be-displayed page is increased, thereby reducing the number of mis-operations.

Figure 3:
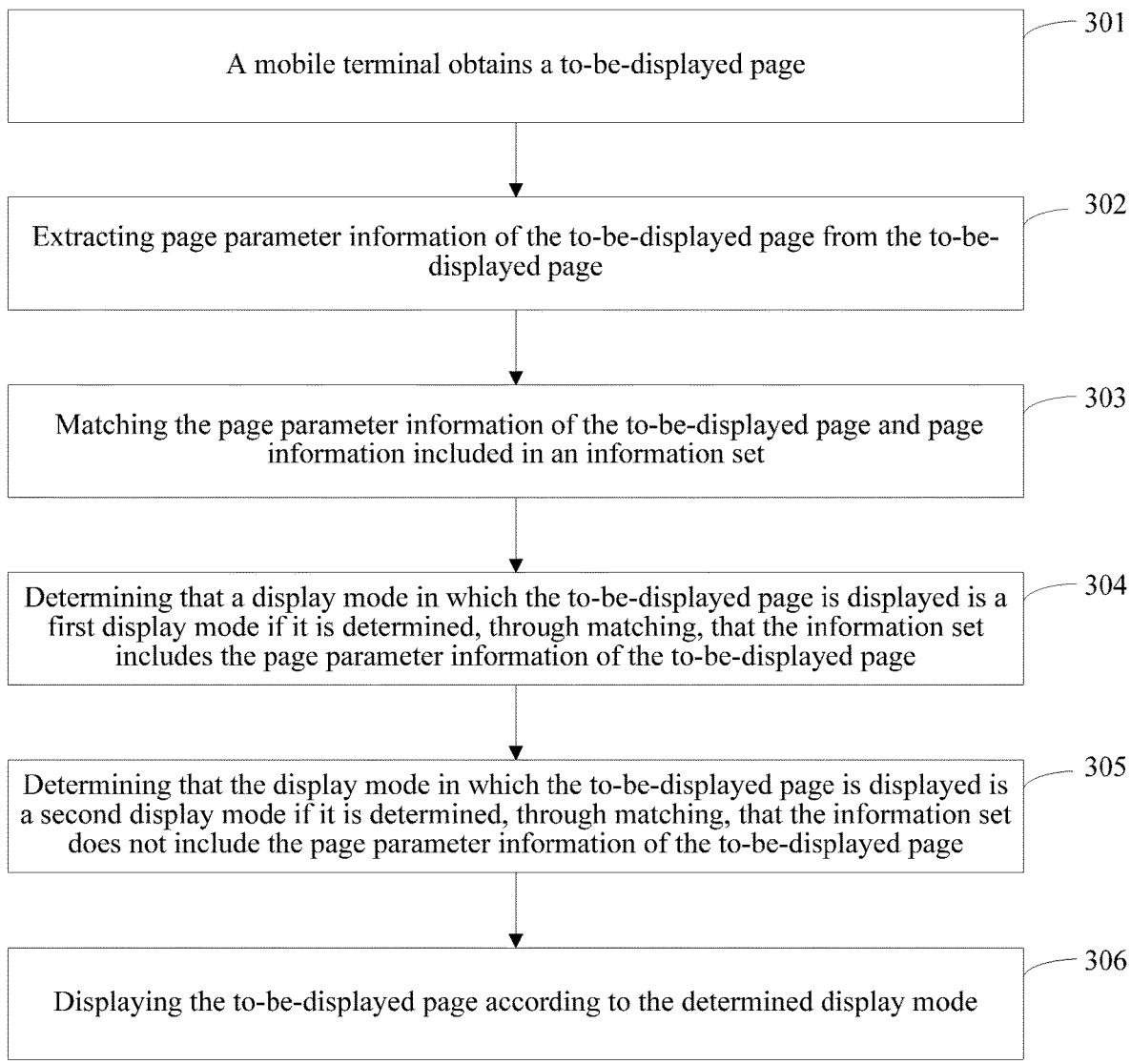
FIG. 3 illustrates a flowchart of another method for displaying a page according to an embodiment of the present disclosure.

Referring to FIG. 3, an embodiment of the present disclosure provides a method for displaying a page, including the followings.

Step 301: A mobile terminal obtains a to-be-displayed page.

Specifically, the mobile terminal obtains a URL of the to-be-displayed page input by a user, determines, according to the URL of the to-be-displayed page, whether the mobile terminal stores the to-be-displayed page in a local buffer, obtains the to-be-displayed page locally buffered by the mobile terminal if the to-be-displayed page is stored in the local buffer, and downloads the to-be-displayed page from a network according to the URL of the to-be-displayed page if the to-be-displayed page is not buffered.

The to-be-displayed page is a page that the user needs to open and display. The user may input the URL of the to-be-displayed page to the mobile terminal in the following several situations.

In a first situation, the to-be-displayed page is a page that the user needs to open in the browser. The user may start the browser in the mobile terminal, input the URL of the to-be-displayed page in an address field displayed in the browser, then submit a command to the mobile terminal, and trigger the mobile terminal to read the URL of the to-be-displayed page from the address field of the browser.

In a second situation, a page currently displayed by the mobile terminal includes a hyperlink of the to-be-displayed page, the hyperlink includes the URL of the to-be-displayed page, and the user may click the hyperlink of the to-be-displayed page in the page currently displayed by the mobile terminal. When detecting a click operation on the hyperlink of the to-be-displayed page, the mobile terminal extracts the URL of the to-be-displayed page from the hyperlink of the to-be-displayed page.

The page currently displayed by the mobile terminal may be a page such as a navigation page opened by the browser or a homepage of a website. The navigation page includes hyperlinks of pages of different types of websites, and the home page of the website includes hyperlink of different pages in the website. The page currently displayed by the mobile terminal may also be a home page of an application, for example, a news application. After being started, the news application displays a home page, and the home page includes hyperlinks of different news pages.

In a third situation, the to-be-displayed page is a page historically opened by the user, and a historical record file in the mobile terminal includes the URL of the to-be-displayed page. The user may open the historical record file in the mobile terminal, search the historical record file for the URL of the to-be-displayed page, and click the URL of the to-be-displayed page. The mobile terminal may obtain the URL of the to-be-displayed page clicked by the user from the historical record.

The user may also input the URL of the to-be-displayed page to the mobile terminal in other one or more situations in addition to the foregoing three situations, and the situations are not listed one by one herein.

Step 302: The mobile terminal extracts page parameter information of the to-be-displayed page from the to-be-displayed page, the page parameter information including a URL of the to-be-displayed page, a page domain name, and a type of page content.

In certain embodiments, the mobile terminal may extract the page parameter information of the to-be-displayed page in the following several manners.

For example, the mobile terminal extracts the URL of the to-be-displayed page from the to-be-displayed page. Because the address field of the to-be-displayed page includes the URL of the to-be-displayed page, the mobile terminal may position the address field of the to-be-displayed page from the to-be-displayed page, and then extracts the URL of the to-be-displayed page from the address field of the to-be-displayed page.

Secondly, the mobile terminal may extract the page domain name of the to-be-displayed page from the URL of the to-be-displayed page.

A URL of a page usually consists of multiple parts, including a protocol header, a page domain name of the page, and a storage path of the page in a website corresponding to the page domain name. In the URL of the page, the protocol header is located before the page domain name, the page domain name is located before the storage path of the page, and the page domain name and the storage path of the page are separated by "/". For example, assuming that a URL of a page is "http://news.sohu.com/s2016/quanguo-lianghui/", the URL includes a protocol header "http://" and a domain name "news.sohu.com", a website corresponding to the domain name "news.sohu.com" is "SohuNews", and the URL further includes a storage path "s2016/quanguo-lianghui" of the page in the website "SohuNews".

Correspondingly, a detailed process that the mobile terminal extracts the page domain name of the to-be-displayed page may include the followings.

The mobile terminal removes a protocol header from the URL of the to-be-displayed page to obtain a first URL, and characters included in the first URL are analyzed one by one from a first character included in the first URL. When a character "/" is obtained through analysis for the first time, a character string located before the character "/" is extracted from the first URL, and the extracted character string is the page domain name of the to-be-displayed page.

Thirdly, the mobile terminal may extract a preset keyword from the URL of the to-be-displayed page and determines the type of the page content of the to-be-displayed page according to the preset keyword.

URLs of some pages include preset keywords, and the preset keywords may show the type of the page content of the page. For example, URLs of some pages include that the preset keyword is "JPG", "PDF", or the like. The preset keyword "JPG" or "PDF" may show that the type of the page content of the page is a picture type. For another example, URLs of some pages include that the preset keyword is "TXT" or the like. The preset keyword "TXT" may show that the type of the page content of the page is a text type.

The mobile terminal includes a keyword set, the keyword set includes at least one preset keyword, and types of page content shown by the preset keywords in the keyword set are types of page content of pages displayed in the first display mode. The keywords included in the keyword set in the mobile terminal may be set by the user in advance or may be downloaded by the mobile terminal from a cloud server in advance.

Correspondingly, the operation that the mobile terminal extracts the preset keyword may be: the mobile terminal checks whether the URL of the to-be-displayed page includes any preset keyword in the keyword set. The preset keyword is extracted if the URL of the to-be-displayed page includes any preset keyword in the keyword set.

It should be noted that for the picture type of the page content, such as comics, the picture type of the page content of the page is usually displayed in a landscape mode. In this way, details of the picture type of the page content can be more clearly displayed. Therefore, if the first display mode is the landscape mode, keywords such as "JPG" and "PDF" included in the keyword set make the mobile terminal display the picture type of the page content in the landscape mode in subsequent steps.

Step 303: The mobile terminal matches the page parameter information of the to-be-displayed page with page information included in an information set, the information set including page parameter information of a page displayed in a first display mode.

Specifically, for each piece of page parameter information of the to-be-displayed page, the page parameter information is compared with each piece of page parameter information in the information set. If, through comparison, the page parameter information is the same as a piece of page parameter information in the information set, it is determined that the information set includes the page parameter information of the to-be-displayed page. If, through comparison, each piece of page parameter information of the to-be-displayed page is different from each piece of page parameter information in the information set, it may be regarded that the information set does not include the page parameter information of the to-be-displayed page.

The information set may be stored in the mobile terminal in advance or may be temporarily downloaded by the mobile terminal from the cloud server before this step is performed.

In certain embodiments, the information set stored in the mobile terminal in advance may be set by the user in advance or may be downloaded from the cloud server and be locally stored by the mobile terminal in advance.

A detailed process that the user sets the information set in advance may include the followings. When the user displays the page by using the mobile terminal, if the mobile terminal needs to display the page in the first display mode, the user may manually set the current display mode of the mobile terminal to the first display mode. When the user completes setting, the mobile terminal displays the page according to the first display mode, extracts the page parameter information from the page, and stores the extracted page parameter information in the information set.

The detailed process that the mobile terminal extracts the page parameter information from the page is the same as the detailed process of extracting the page parameter information of the to-be-displayed page from the to-be-displayed page. Details are not described herein.

In certain embodiments, in the cloud server, the information set is stored in a form of a configuration file, and the page parameter information of the page is displayed in the first display mode. The configuration file may be obtained by the cloud server based on big-data analysis. In a specific implementation, the cloud server may collect historical records of users. The historical record includes pages opened by the users and display modes in which the pages are displayed, and big-data analysis is performed on the historical records to obtain the configuration file.

For any user, when the user opens a page by using the mobile terminal, the mobile terminal may report to the cloud server the page and a display mode in which the page is displayed. The cloud server receives the page and the display mode in which the page is displayed, and stores the page and the display mode in which the page is displayed in a historical record file of the user, to collect historical record information of the user.

In certain embodiments, a detailed process that the cloud server performs big data analysis on the historical record information of the users may include the followings.

The cloud server extracts, from the historical record information of the users, pages opened by the users and display modes in which the pages are opened. For each opened page, the cloud server counts the total number of users opening the pages and the number of first users displaying the pages in the first display mode, and calculates a ratio of the number of first users to the total number of users. If the ratio exceeds a preset ratio, the cloud server extracts page parameter information of the pages from the pages and stores the extracted page parameter information in the information set.

The detailed process that the cloud server extracts the page parameter information from the page is the same as the detailed process that the mobile terminal extracts the page parameter information of the to-be-displayed page from the to-be-displayed page. Details are not described herein.

Step 304: The mobile terminal determines that the display mode to display the to-be-displayed page is the first display mode if it is determined, through matching, that the information set includes the page parameter information of the to-be-displayed page.

Step 305: The mobile terminal determines that the display mode to display the to-be-displayed page is the second display mode if it is determined, through matching, that the information set does not include the page parameter information of the to-be-displayed page.

The display mode of the mobile terminal includes the first display mode and the second display mode. When the first display mode is the landscape mode, the second display mode is a portrait mode; when the first display mode is the portrait mode, the second display mode is the landscape mode. Therefore, if it is determined, through matching, that the information set does not include the page parameter information of the to-be-displayed page, it indicates that the to-be-displayed page is not displayed in the first display mode. Therefore, it can be determined that the display mode to display the to-be-displayed page is the second display mode.

Step 306: The mobile terminal displays the to-be-displayed page according to the determined display mode.

Specifically, the mobile terminal sets the display mode of the mobile terminal to the determined display mode, and then displays the to-be-displayed page in the determined display mode.

In one embodiment, when obtaining the to-be-displayed page, the mobile terminal extracts the page parameter information from the to-be-displayed page and matches the page parameter information and the page parameter information in the information set, determines that the display mode to display the to-be-displayed page is the first display mode if it is determined, through matching, that the information set includes the page parameter information of the to-be-displayed page, and determines that the display mode to display the to-be-displayed page is the second display mode if it is determined, through matching, that the information set does not include the page parameter information of the to-be-displayed page. In this way, the display mode can be automatically set, and the accuracy for determining the display mode according to the page parameter information of to-be-displayed page can be improved, thereby reducing the number of mis-operations.

Figure 4:
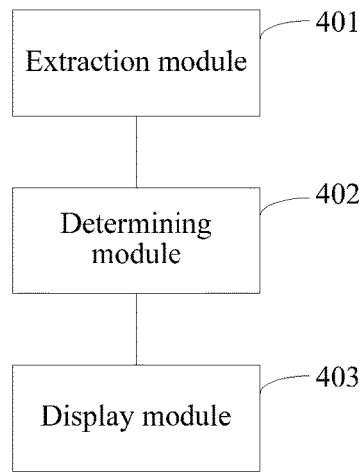
FIG. 4 illustrates a schematic structural diagram of an apparatus for displaying a page according to an embodiment of the present disclosure.

Referring to FIG. 4, an embodiment of the present disclosure provides an apparatus for displaying a page, and the apparatus may include an extraction module 401, a determining module 402, and a display module 403.

The extraction module 401 is configured to extract, from a to-be-displayed page, page parameter information of the to-be-displayed page, the page parameter information including at least one of a uniform resource locator (URL) of the to-be-displayed page, a type of page content, and a page domain name.

The determining module 402 is configured to determine, according to the page parameter information of the to-be-displayed page, a display mode to display the to-be-displayed page; and The display module 403 is configured to display the to-be-displayed page according to the determined display mode.

In certain embodiments, the extraction module 401 includes a first extraction unit, a second extraction unit, and/or a third extraction unit.

The first extraction unit is configured to extract the URL of the to-be-displayed page from the to-be-displayed page. The second extraction unit is configured to extract the page domain name of the to-be-displayed page from the URL of the to-be-displayed page. The third extraction unit is configured to extract a preset keyword from the URL of the to-be-displayed page and determine the type of the page content of the to-be-displayed page according to the preset keyword.

In certain embodiments, the determining module 402 includes a matching unit, a first determining unit, and a second determining unit.

The matching unit is configured to match the page parameter information of the to-be-displayed page and page parameter information included in an information set, the information set including page parameter information of a page displayed in a first display mode.

The first determining unit is configured to determine that the display mode to display the to-be-displayed page is the first display mode if it is determined, through matching, that the information set includes the page parameter information of the to-be-displayed page.

The second determining unit is configured to determine that the display mode to display the to-be-displayed page is a second display mode if it is determined, through matching, that the information set does not include the page parameter information of the to-be-displayed page.

In certain embodiments, the apparatus further includes an obtaining module, which is configured to obtain the information set before matching the page parameter information of the to-be-displayed page and the information set.

In certain embodiments, the obtaining module includes an obtaining unit and/or a downloading unit.

The obtaining unit is configured to obtain a page displayed in the first display mode and configured by a user, and extract page parameter information from the obtained page and compose the information set.

The downloading unit is configured to download the information set from a cloud server, the information set being obtained by collecting, by the cloud server, historical record information of users and analyzing the historical record information, and the historical record information including pages opened by the users and display modes in which the pages are displayed.

In one embodiment, the information set is a configuration file or a database. The first display mode is a landscape mode, and the second display mode is a portrait mode, or the first display mode is a portrait mode, and the second display mode is a landscape mode.

In one embodiment, accordingly, when obtaining the to-be-displayed page, the mobile terminal extracts the page parameter information from the to-be-displayed page and matches the page parameter information and the page parameter information in the information set, determines that the display mode to display the to-be-displayed page is the first display mode if it is determined, through matching, that the information set includes the page parameter information of the to-be-displayed page, and determines that the display mode to display the to-be-displayed page is the second display mode if it is determined, through matching, that the information set does not include the page parameter information of the to-be-displayed page. In this way, the display mode can be automatically set, and the accuracy for determining the display mode according to the page parameter information of to-be-displayed page can be improved, thereby reducing the number of mis-operations.

Figure 5:
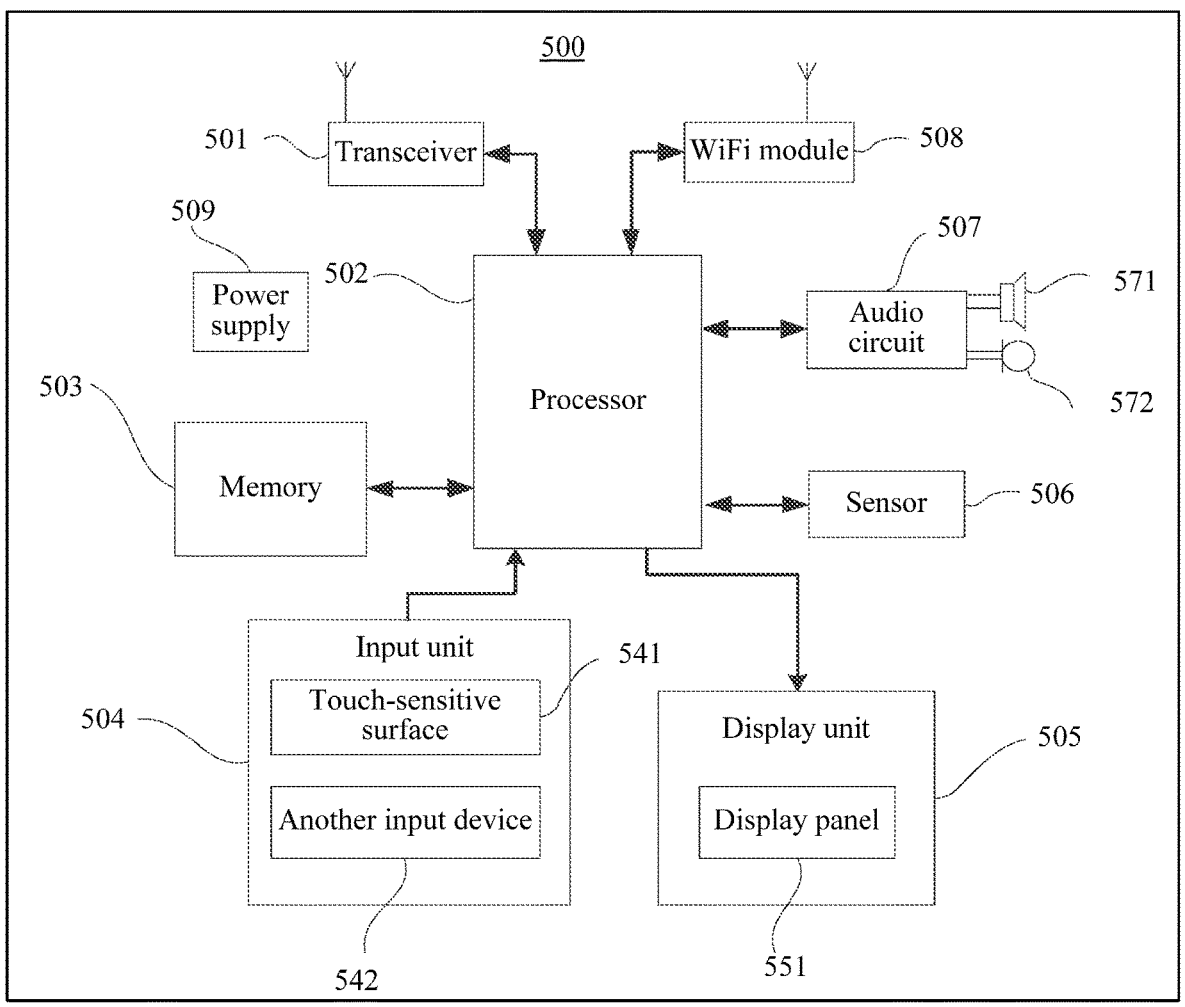
FIG. 5 illustrates a schematic structural diagram of a mobile terminal according to an embodiment of the present disclosure.

Referring to FIG. 5, an embodiment of the present disclosure provides a mobile terminal 500. The structure of the mobile terminal 500 may be the structure of a terminal shown in FIG. 5. The mobile terminal 500 may be a mobile phone or a tablet computer or an in-vehicle terminal, and includes at least a transceiver 501, a processor 502 including one or more processing cores, and a memory 503 including one or more computer readable storage instructions.

The processor 502 may be configured to perform the method for displaying a page provided by any one of the foregoing embodiments. It should be noted that the mobile terminal 500 further includes, in addition to the foregoing three components, other components, and the processor 502, the memory 503, and the transceiver 501 may further have, in addition to the functions described above, other functions.

For example, the mobile terminal 500 may further include components such as an input unit 504, a display unit 505, a sensor 506, an audio circuit 507, and a wireless fidelity (WiFi) module 508. It should be noted that a person skilled in the art may understand that the structure of the terminal shown in FIG. 5 does not constitute a limitation to the mobile terminal 500, and the mobile terminal may include more components or fewer components than those shown in the figure, or some components may be combined, or a different component deployment may be used.

In addition, the transceiver 501 may further be configured to receive and send signals during information receiving and sending or during a call. Particularly, the transceiver 501 receives downlink information from a base station, then delivers the downlink information to one or more processors 502 for processing, and sends related uplink data to the base station. Generally, the transceiver 501 includes but is not limited to an antenna, at least one amplifier, a tuner, one or more oscillators, a subscriber identity module (SIM) card, a transceiver, a coupler, a low noise amplifier (LNA), a duplexer, and the like. In addition, the transceiver 501 may also communicate with a network and another device by wireless communication. The wireless communication may use any communications standard or protocol, which includes but is not limited to, Global System for Mobile Communications (GSM), General Packet Radio Service (GPRS), Code Division Multiple Access (CDMA), Wideband Code Division Multiple Access (WCDMA), Long Term Evolution (LTE), email, Short Message Service (SMS), and the like.

The memory 503 may be configured to store a software program and module. The processor 502 runs the software program and module stored in the memory 503, to implement various functional applications and data processing. The memory 503 may mainly include a program storage area and a data storage area. The program storage area may store an operating system, an application required by at least one function (such as a sound playback function and an image display function), and the like. The data storage area may store data (such as audio data and an address book) created according to use of the mobile terminal 500, and the like. In addition, the memory 503 may include a high speed random access memory, and may further include a non-volatile memory, such as at least one magnetic disk storage device, a flash memory, or other volatile solid-state storage devices. Correspondingly, the memory 503 may further include a memory controller, to provide access of the processor 502 and the input unit 504 to the memory 503.

The input unit 504 may be configured to receive input digit or character information, and generate a keyboard, mouse, joystick, optical or track ball signal input related to the user setting and function control. Specifically, the input unit 504 may include a touch-sensitive surface 541 and another input device 542. The touch-sensitive surface 541, which may also be referred to as a touchscreen or a touchpad, may collect a touch operation of a user on or near the touch-sensitive surface (such as an operation of a user on or near the touch-sensitive surface 541 by using any suitable object or accessory, such as a finger or a stylus), and drive a corresponding connection apparatus according to a preset program. In certain embodiments, the touch-sensitive surface 541 may include a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 502. Moreover, the touch controller can receive and execute a command sent by the processor 502. In addition, the touch-sensitive surface 541 may be a resistive, capacitive, infrared, or surface sound wave type touch-sensitive surface. In addition to the touch-sensitive surface 541, the input unit 504 may further include the another input device 542. Specifically, the another input device 542 may include, but is not limited to: one or more of a physical keyboard, a functional key (such as a volume control key or a switch key), a track ball, a mouse, and a joystick.

The display unit 505 may be configured to display information input by the user or information provided for the user, and various graphical user interfaces of the mobile terminal 500. The graphical user interfaces may be formed by a graph, a text, an icon, a video, and any combination thereof. The display unit 505 may include a display panel 551. In certain embodiments, the display panel 551 may be configured by using a liquid crystal display (LCD), an organic light-emitting diode (OLED), or the like. Further, the touch-sensitive surface 541 may cover the display panel 551. After detecting a touch operation on or near the touch-sensitive surface 541, the touch-sensitive surface 551 transfers the touch operation to the processor 502, to determine the type of the touch event. Then, the processor 502 provides a corresponding visual output on the display panel 1241 according to the type of the touch event. Although, in FIG. 5, the touch-sensitive surface 541 and the display panel 551 are used as two separate parts to implement input and output functions, in some embodiments, the touch-sensitive surface 541 and the display panel 551 may be integrated to implement the input and output functions.

The mobile terminal 500 includes at least one sensor 506 such as an optical sensor, a motion sensor, and other sensors. Specifically, the light sensor may include an ambient light sensor and a proximity sensor. The ambient light sensor may adjust luminance of the display panel 551 according to brightness of the ambient light. The proximity sensor may switch off the display panel 551 and/or backlight when the mobile terminal 500 is moved to the ear. As one type of motion sensor, a gravity acceleration sensor may detect magnitude of accelerations in various directions (which generally are triaxial), may detect magnitude and a direction of the gravity when static, and may be used for an application that recognizes the attitude of the terminal (for example, switching between landscape orientation and portrait orientation, a related game, and magnetometer attitude calibration), and a function related to vibration recognition (such as a pedometer and a knock). Other sensors, such as a gyroscope, a barometer, a hygrometer, a thermometer, and an infrared sensor, which may be configured in the mobile terminal 500 are not further described herein.

The audio circuit 507 includes a speaker 571 and a microphone 572. The speaker 571 and the microphone 572 may provide an audio interface between the user and the mobile terminal 500. The audio circuit 507 may convert received audio data into an electric signal and transmit the electric signal to the speaker 571. The speaker 571 converts the electric signal into a sound signal for output. On the other hand, the microphone 572 converts a collected sound signal into an electric signal. The audio circuit 507 receives the electric signal and converts the electric signal into audio data, and outputs the audio data to the processor 502 for processing. Then, the processor 502 sends the audio data to, for example, another terminal by using the transceiver 501, or outputs the audio data to the memory 503 for further processing. The audio circuit 507 may further include an earphone jack, so as to provide communication between a peripheral earphone and the mobile terminal 500.

WiFi is a short distance wireless transmission technology. The mobile terminal 500 may help, by using the WiFi module 508, the user to receive and send emails, browse a page, access streaming media, and so on, which provides wireless broadband Internet access for the user. Although FIG. 5 shows the WiFi module 508, it may be understood that the WiFi module 508 is not a necessary component of the mobile terminal 500, and when required, the WiFi module 508 may be omitted as long as the scope of the essence of the present disclosure is not changed.

The processor 502 is a control center of the mobile terminal 500, and connects to various parts of the terminal by using various interfaces and lines. By running or executing the software program and/or module stored in the memory 503, and invoking data stored in the memory 503, the processor 502 executes various functions and data processing of the mobile terminal 500, thereby performing overall monitoring on the mobile terminal 500. In certain embodiments, the processor 502 may integrate an application processor and a modem. The application processor mainly processes an operating system, a user interface, an application, and the like. The modem mainly processes wireless communication. It may be understood that the foregoing modem processor may alternatively not be integrated into the processor 502.

The mobile terminal 500 further includes a power supply 509 (such as a battery) for supplying power to the components. Preferably, the power supply 509 may be logically connected to the processor 502 by using a power management system, thereby implementing functions such as charging, discharging, and power consumption management by using the power management system. The power supply 509 may further include one or more of a direct current or alternating current power supply, a re-charging system, a power failure detection circuit, a power supply converter or inverter, a power supply state indicator, and any other components.

Although not shown in the figure, the mobile terminal 500 may further include a camera, a Bluetooth module, and the like, which are not described herein. Specifically, in this embodiment, the processor 502 of the mobile terminal 500 may further have the following functions:

The processor 502 is configured to: extract, from a to-be-displayed page, page parameter information of the to-be-displayed page, the page parameter information including at least one of a uniform resource locator (URL) of the to-be-displayed page, a type of page content, and a page domain name; determine, according to the page parameter information of the to-be-displayed page, a display mode to display the to-be-displayed page; and display the to-be-displayed page according to the determined display mode.

In certain embodiments, the processor 502 may extract the page parameter information of the to-be-displayed page from the to-be-displayed page in the following manners, including extracting the URL of the to-be-displayed page from the to-be-displayed page; extracting the page domain name of the to-be-displayed page from the URL of the to-be-displayed page; and/or extracting a preset keyword from the URL of the to-be-displayed page and determining the type of the page content of the to-be-displayed page according to the preset keyword.

In certain embodiments, the processor 502 may determine, according to the page parameter information of the to-be-displayed page, the display mode to display the to-be-displayed page in the following manners, including: matching the page parameter information of the to-be-displayed page and page parameter information included in an information set, the information set including page parameter information of a page displayed in a first display mode; determining that the display mode to display the to-be-displayed page is the first display mode if it is determined, through matching, that the information set includes the page parameter information of the to-be-displayed page; and determining that the display mode to display the to-be-displayed page is a second display mode if it is determined, through matching, that the information set does not include the page parameter information of the to-be-displayed page.

In certain embodiments, the processor 502 is further configured to obtain the information set before matching the page parameter information of the to-be-displayed page and the information set.

In certain embodiments, the processor 502 may obtain the information set in the following manner, including: obtaining a page displayed in the first display mode and configured by a user, and extracting page parameter information from the obtained page and composing the information set; or downloading the information set from a cloud server, the information set being obtained by collecting, by the cloud server, historical record information of users and analyzing the historical record information, and the historical record information including pages opened by the users and display modes in which the pages are displayed.

In one embodiment, the information set is a configuration file or a database. The first display mode is a landscape mode, and the second display mode is a portrait mode, or the first display mode is a portrait mode, and the second display mode is a landscape mode.

In one embodiment, when obtaining the to-be-displayed page, the mobile terminal extracts the page parameter information from the to-be-displayed page and matches the page parameter information and the page parameter information in the information set, determines that the display mode to display the to-be-displayed page is the first display mode if it is determined, through matching, that the information set includes the page parameter information of the to-be-displayed page, and determines that the display mode to display the to-be-displayed page is the second display mode if it is determined, through matching, that the information set does not include the page parameter information of the to-be-displayed page. In this way, the display mode can be automatically set, and the accuracy for determining the display mode according to the page parameter information of to-be-displayed page can be improved, thereby reducing the number of mis-operations.

An embodiment of the present disclosure further provides a computer storage medium, the computer storage medium storing computer executable instructions, and the computer executable instructions being configured to perform the foregoing method for displaying a page.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

INDUSTRIAL APPLICABILITY

In the embodiments of the present disclosure, the display mode to display the to-be-displayed page is determined according to the page parameter information of the to-be-displayed page. As a result, the display mode can be automatically set, thereby reducing a time for a user operation and setting of the display mode, and the accuracy for determining the display mode according to the page parameter information of to-be-displayed page can be improved, thereby reducing the number of mis-operations.

What is claimed is:

1. A method for displaying a page on a user terminal, the method comprising:
   extracting, from a uniform resource locator (URL) of a to-be-displayed page, page parameter information of the to-be-displayed page, including:
      removing a protocol header from the URL to obtain a shortened URL;
      extracting a page domain name from the shortened URL;
      extracting a storage path from the shortened URL;
      extracting a preset keyword from the shortened URL to indicate a type of page content; and
      including in the page parameter information at least one of the page domain name, the storage path, and the preset keyword;
   screening the page parameter information against an information set prestored on the user terminal, the information set including a correspondence between various pieces of page parameter information and a portrait mode or a landscape mode, wherein the screening includes:
      downloading the information set from a cloud server, wherein the cloud server counts a total number of users who have opened pages, counts a first number of the users displaying the pages in the landscape mode or the portrait mode, and calculates a ratio of the first number of the users to the total number of the users, and wherein upon determining the ratio exceeds a preset ratio, the cloud server extracts page parameter information of the pages and stores the page parameter information as extracted from the pages in the information set;
   determining, according to a screening result of the screening, to display the to-be-displayed page in the portrait mode or the landscape mode; and
   displaying the to-be-displayed page in the portrait mode or the landscape mode as determined.

2. The method according to claim 1, further comprising:
   obtaining the information set before screening the page parameter information against the information set.

3. The method according to claim 2, wherein the obtaining the information set comprises:
   obtaining a page opened by a user and extracting page parameter information from the obtained page into the information set; or
   downloading the information set from a cloud server, the information set being obtained by the cloud server by collecting historical record information of users and analyzing the historical record information, and the historical record information including pages opened by the users and display modes in which the pages are displayed.

4. The method according to claim 3, wherein the information set is a configuration file or a database.

5. The method according to claim 1, further comprising:
   screening the preset keyword as extracted from the shortened URL against a keyword set stored on the user terminal, the keyword set including a correspondence between preset keywords and types of page content of pages, wherein the types of page content of pages include a picture page or a text page.

6. An apparatus for displaying a page on a user terminal, the apparatus comprising: a memory storing computer program instructions; and a processor coupled to the memory and, when executing the computer program instructions, configured to perform:
   extracting, from a uniform resource locator (URL) of a to-be-displayed page, page parameter information of the to-be-displayed page, including:
      removing a protocol header from the URL to obtain a shortened URL;
      extracting a page domain name from the shortened URL;
      extracting a storage path from the shortened URL;
      extracting a preset keyword from the shortened URL to indicate a type of page content; and
      including in the page parameter information at least one of the page domain name, the storage path, and the preset keyword;
   screening the page parameter information against an information set prestored on the user terminal, the information set including a correspondence between various pieces of page parameter information and a portrait mode or a landscape mode, wherein the screening includes:
      downloading the information set from a cloud server, wherein the cloud server counts a total number of users who have opened pages, counts a first number of the users displaying the pages in the landscape mode or the portrait mode, and calculates a ratio of the first number of the users to the total number of the users, and wherein upon determining the ratio exceeds a preset ratio, the cloud server extracts page parameter information of the pages and stores the page parameter information as extracted from the pages in the information set;

determining, according to a screening result of the screening, to display the to-be-displayed page in the portrait mode or the landscape mode; and displaying the to-be-displayed page in the portrait mode or the landscape mode as determined.

7. The apparatus according to claim 6, wherein the processor is further configured to perform:

obtaining the information set before screening the page parameter information against the information set.

8. The apparatus according to claim 7, wherein the processor is further configured to perform:

obtaining a page opened by a user and extracting page parameter information from the obtained page into the information set; or downloading the information set from a cloud server, the information set being obtained by the cloud server by collecting historical record information of users and analyzing the historical record information, and the historical record information including pages opened by the users and display modes in which the pages are displayed.

9. The apparatus according to claim 6, wherein the information set is a configuration file or a database.

10. A non-transitory computer-readable storage medium storing computer program instructions executable by at least one processor to perform:

extracting, from a uniform resource locator (URL) of a to-be-displayed page, page parameter information of the to-be-displayed page, including:
　removing a protocol header from the URL to obtain a shortened URL;
　extracting a page domain name from the shortened URL;
　extracting a storage path from the shortened URL;
　extracting a preset keyword from the shortened URL to indicate a type of page content; and
　including in the page parameter information at least one of the page domain name, the storage path, and the preset keyword;

screening the page parameter information against an information set prestored on a user terminal, the information set including a correspondence between various pieces of page parameter information and a portrait mode or a landscape mode, wherein the screening includes:
　downloading the information set from a cloud server, wherein the cloud server counts a total number of users who have opened pages, counts a first number of the users displaying the pages in the landscape mode or the portrait mode, and calculates a ratio of the first number of the users to the total number of the users, and wherein upon determining the ratio exceeds a preset ratio, the cloud server extracts page parameter information of the pages and stores the page parameter information as extracted from the pages in the information set;

determining, according to a screening result of the screening, to display the to-be-displayed page in the portrait mode or the landscape mode; and displaying the to-be-displayed page in the portrait mode or the landscape mode as determined.

11. The non-transitory computer-readable storage medium according to claim 10, wherein the computer program instructions further cause the at least one processor to perform:

obtaining the information set before screening the page parameter information against the information set.

12. The non-transitory computer-readable storage medium according to claim 11, wherein the obtaining the information set comprises:

obtaining a page opened by a user and extracting page parameter information from the obtained page into the information set; or downloading the information set from a cloud server, the information set being obtained by the cloud server by collecting historical record information of users and analyzing the historical record information, and the historical record information including pages opened by the users and display modes in which the pages are displayed.

13. The non-transitory computer-readable storage medium according to claim 12, wherein the information set is a configuration file or a database.

\* \* \* \* \*